US008897309B2

(12) United States Patent
Vikberg et al.

(10) Patent No.: US 8,897,309 B2
(45) Date of Patent: Nov. 25, 2014

(54) TELECOMMUNICATION SYSTEM FOR CONTROLLING MEDIA GATEWAYS

(75) Inventors: Jari Vikberg, Järna (SE); Tomas Nylander, Värmdö (SE); Jan Sjölund, Saltsjö-Boo (SE); Jan Gjärdman, Farsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 998 days.

(21) Appl. No.: 12/513,460

(22) PCT Filed: Nov. 6, 2006

(86) PCT No.: PCT/SE2006/001255
§ 371 (c)(1),
(2), (4) Date: May 4, 2009

(87) PCT Pub. No.: WO2008/057012
PCT Pub. Date: May 15, 2008

(65) Prior Publication Data
US 2010/0067437 A1    Mar. 18, 2010

(51) Int. Cl.
*G01R 31/08* (2006.01)
*H04L 12/28* (2006.01)
*H04L 29/06* (2006.01)
*H04W 28/08* (2009.01)
*H04L 12/66* (2006.01)
*H04W 88/16* (2009.01)

(52) U.S. Cl.
CPC .............. *H04L 12/66* (2013.01); *H04L 65/103* (2013.01); *H04L 65/1043* (2013.01); *H04W 28/08* (2013.01); *H04W 88/16* (2013.01)
USPC .......................................... 370/401; 370/230

(58) Field of Classification Search
None
See application file for complete search history.

(56) References Cited

U.S. PATENT DOCUMENTS

| | | | | |
|---|---|---|---|---|
| 5,781,624 | A  * | 7/1998  | Mitra et al. | 379/244 |
| 6,765,921 | B1 * | 7/2004  | Stacey et al. | 370/401 |
| 6,766,377 | B1   | 7/2004  | Grabelsky | |
| 2005/0083844 | A1 | 4/2005 | Zhu | |
| 2005/0085181 | A1 | 4/2005 | Tao | |
| 2006/0258358 | A1 * | 11/2006 | Kallio | 455/437 |
| 2006/0286984 | A1 * | 12/2006 | Bonner | 455/445 |
| 2007/0253371 | A1 * | 11/2007 | Harper et al. | 370/331 |
| 2011/0009122 | A1 * | 1/2011 | Kalavade | 455/445 |

FOREIGN PATENT DOCUMENTS

| | | |
|---|---|---|
| GB | 2399710 A | 9/2004 |
| WO | WO 93/00776 A1 | 1/1993 |

* cited by examiner

*Primary Examiner* — Jutai Kao (57) ABSTRACT

A telecommunication system and method for controlling the establishment of payload connections through media gateways. The system receives and aggregates control orders from a plurality of telecommunication nodes such as media gateway controllers. The system uses knowledge of resources in the network to optimize the path of the payload connection. The system also sends control orders to a given media gateway in order to establish the payload connection. The system may be connected to a plurality of other instances of the same type of system in a hierarchical manner.

14 Claims, 10 Drawing Sheets

TELECOMMUNICATION SYSTEM FOR CONTROLLING MEDIA GATEWAYS

TECHNICAL FIELD OF THE INVENTION

The present invention relates to a telecommunication system and a method for controlling the establishment of connections in a telecommunication network.

DESCRIPTION OF RELATED ART

Traditional telecommunication networks are undergoing an important transition period. New multimedia services require that the networks are more flexible than the present-day networks and that they can offer bandwidth on demand. In order to achieve this flexibility, the current Time Division Multiplexing (TDM) based network needs to migrate towards a packet switched network. This network will use technologies such as the Asynchronous Transfer Mode (ATM) and/or the Internet Protocol (IP).

Moreover, the telecommunication network is also migrating towards a new network architecture. Call control and connectivity, which have traditionally been bundled together, are being separated in different layers. A connectivity layer does primarily consist of a packet switched network and the bridging between the packet switched network and the legacy networks such as the Public Switched Telephony Network (PSTN) is done in Media Gateways (MG). The connectivity layer and the Media Gateways have no knowledge of call related features. Call related features and the call control intelligence (the call control layer) reside in another entity or network element called a Media Gateway Controller (MGC) (in some literature also referred to as a Call Agent or a softswitch). The MGC and the MG acts in a master-slave configuration using a gateway control protocol such as the MGCP or the Megaco/H.248 protocol. The MGC is the master server and the MG is the slave client that behaves like a simple switch.

The MGC can for example comprise the call control layer logic of a mobile switching center MSC (a MSC server) and the media gateway MG can comprise logic for the MSC's connectivity layer.

The objects in a MG that can be controlled by a MGC are defined in the Megaco/H.248 standard as two abstractions, Terminations and Contexts. Earlier media gateway protocols similar to Megaco/H.248 such as the MGCP use the abstractions Endpoint and Connection, which corresponds to Termination and Context respectively.

A Termination is a logical entity on a MG that sources and/or sinks media and/or control streams. Terminations represent physical entities that have a semi-permanent existence as for example a TDM channel.

A Context is defined as an association between a collection of Terminations in a MG. A Termination can only belong to one Context at a time. A Context and all of the Terminations it contains are associated with a single MGC. A context is created by adding the first termination, and it is released by removing (subtracting) the last termination.

Contexts are created and released by the MG under command of the MGC. The Megaco/H.248 protocol provides commands for the MGC to manipulate the Contexts and Terminations in the MG. For example, commands exist to add Terminations to a Context, modify Terminations and to subtract Terminations from a Context. In other words, establishing a connection through a MG means basically that the MGC orders Terminations to be placed in a Context.

One MGC can control one or more MGs (a Domain) and if the network includes several MGCs, these can communicate with each other using inter-domain signaling as for example the ITU-T standardized BICC (Bearer Independent Call Control) protocol or SIP (Session Initiation Protocol).

The packet based network technology is often initially introduced in the core network between different media gateways. Several access networks will also evolve towards a packet based network, such as the GSM radio access network and the unlicensed mobile access network, UMAN. In TDM based networks voice calls are normally coded using PCM (Pulse Code Modulation) according to ITU-T Recommendation G.711 whereas in packet networks other coding standards can be used (such as AMR, Adaptive Multi-Rate).

When migrating from the traditional telecommunication network into a packet based network with call and connectivity separation, it can be necessary to cope with a number of different network configurations. The Megaco/H.248 standard (ITU-T Recommendation H.248.1 Section 11) discloses for example the possibility to let a single physical MG to be partitioned in several virtual media gateways (VMGs). Each VMG communicates with 'its own' media gateway controller MGC. A media gateway comprising a plurality of virtual media gateways is for example disclosed in the US patent application with publication number US 2005/0085181. The concept of virtual media gateways can be useful when two or more media gateways of different types need to be co-located. A drawback with this solution is that it requires specially designed media gateways.

A somewhat opposite configuration is disclosed in U.S. Pat. No. 6,766,377. This patent discloses a virtual media gateway including a plurality of standalone media gateways. The patent describes a media gateway proxy that allows a media gateway controller MGC to view the virtual media gateway, representing all the standalone media gateways, as a single media gateway.

The International Patent Application WO93/00776 discloses a software architecture that allows a telecommunication switch to have a plurality of application modules, where each application module comprises logic for a particular application. An application is for example representing a PSTN application or it could represent a PLMN (GSM) application. The software within this architecture is networked within the exchange in a manner similar to the way in which discrete exchanges are networked with each other but where the switch resources are shared among the application modules. The architecture in this patent application allows great flexibility within a single exchange but does not address networks including a plurality of media gateways and media gateway controllers.

SUMMARY OF THE INVENTION

A problem that arises when the current TDM based network migrates to a packet based network is that voice conversions between the TDM based network and the packet based network can be necessary when establishing a connection. An example is when a packet based radio access network (such as in GSM) comprising a BSC (Base Station Controller) is connected to a media gateway MG through a standardized and TDM based A-interface. In a call between a first mobile terminal and a second mobile terminal connected to the same radio access network, the connectivity layer is routed from the first mobile terminal through a radio base station (BTS), through the base station controller (BSC) to the media gateway MG and back again through the BSC and a BTS to the second mobile terminal. In this call, the voice from the first terminal has to be converted from the coding standard used in the packet based radio access network (such as AMR) to standard PCM (G.711) used in the TDM based A-interface and converted back again to AMR before it reaches the second mobile terminal. Each conversion between TDM and IP and between PCM and AMR will result in additional delays and voice degradation.

A possibility to avoid the several conversion stages is to modify the standard of the A-interface. This is however not immediately foreseen as this requires a lot of standardization efforts and it will take a long time before the existing networks are upgraded to the new standard.

Another problem in the example above is that when routing the call via the media gateway MG more transmission resources are used than if the call had been routed internally in the radio access network. This problem is of particular importance if the radio access network is remotely located from the media gateway MG.

The problems listed above are in the current invention solved by introducing a new type of telecommunication system. This telecommunication system comprises a plurality of communication modules and a media gateway control module MGCM. Each communication module is adapted to be connectable to a telecommunication node as for example a media gateway controller MGC or some other node in the telecommunication network. Each communication module extracts control orders received in signaling messages from the telecommunication nodes. The media gateway control module MGCM is connected to the plurality of communication modules. The MGCM is further adapted to be connectable to at least one media gateway MG. The communication module sends the control orders to the MGCM which aggregates the control orders towards a one and the same media gateway MG. The MGCM is, as an option, further adapted to calculate the most optimal path (using for example known methods for selecting the path with the lowest sum of cost parameters) and to order a connection to be established in the MG by sending media gateway control orders to said MG.

An advantage of using the current invention in the example above with the GSM network is that the TDM based A-interface between the BSC and the MSC can be eliminated from a payload perspective as the connectivity layer part in the BSC can be incorporated in the media gateway MG. The media gateway MG can now switch packet data directly between the radio base stations BTS and an AMR/PCM voice conversion is no longer necessary.

The current invention has also the advantage of significantly reduce the need of transmission resources by enabling local switching in a remotely located access network. By placing a local media gateway in the remotely located access network and having said local media gateway controlled by a telecommunication system according to the present invention, call control is still executed in or close to the core network but the connectivity layer is now switched locally by the local media gateway in the remotely located access network.

Another advantage of the current invention is that it is possible to re-use standard media gateway controllers and media gateways, using standard interfaces. Yet another advantage is that the new type of telecommunication system allows the import and integration of logic from telecommunication nodes today situated in the existing telecommunication network.

The objective with the current invention is to offer network operators a possibility to build telecommunication networks in a more flexible manner than ever before. One example is to facilitate the migration from TDM to packet based networks and another example is to reduce the need of transmission resources for said networks.

The invention will now be described in more detail and with preferred embodiments and referring to accompanying drawings.

DETAILED DESCRIPTION OF EMBODIMENTS

Figure 1A:
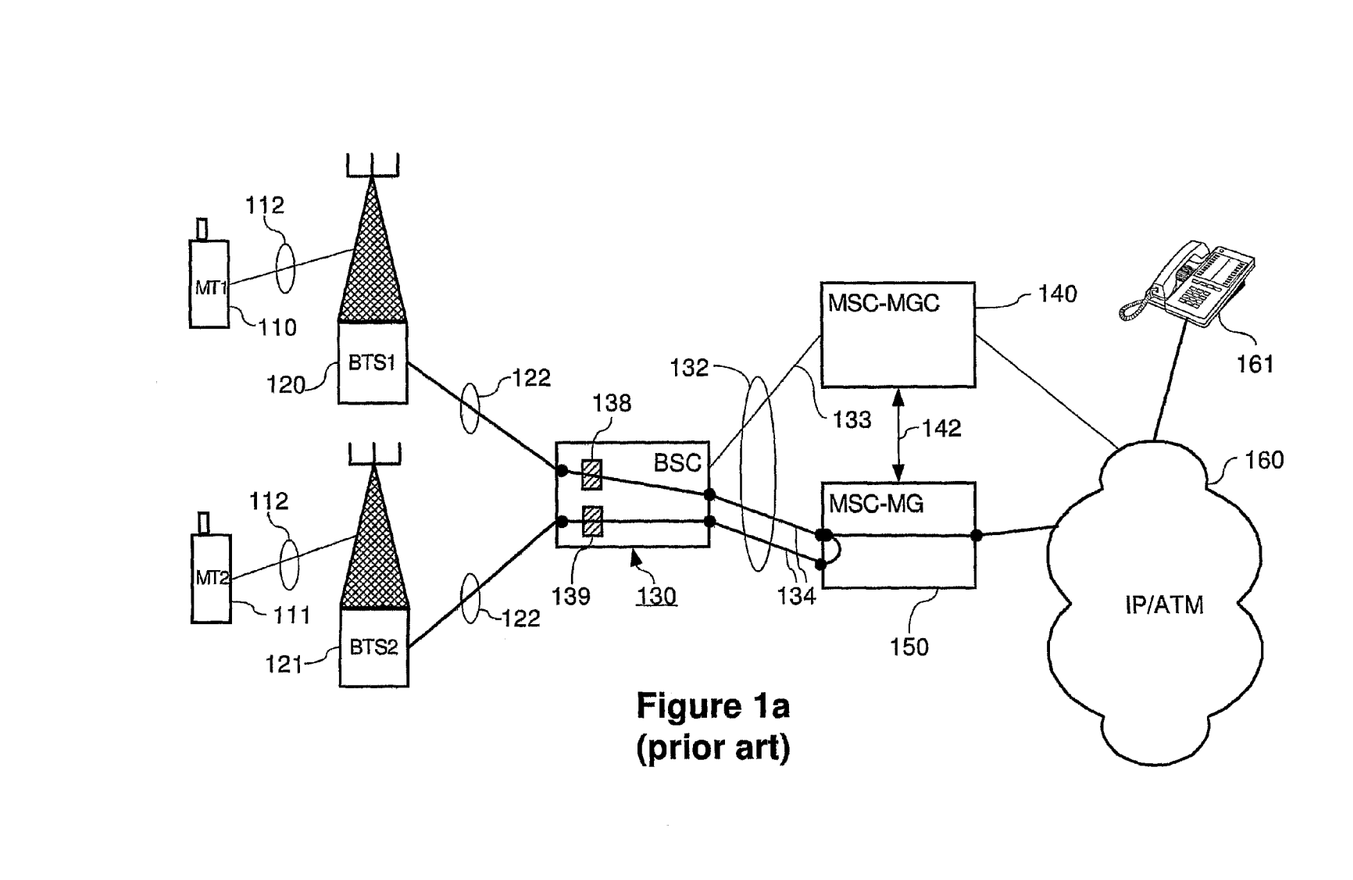
FIG. 1a is a block diagram showing a GSM network involving an MSC where call and connectivity control is separated.

FIG. 1a illustrates a known GSM network comprising a radio access network comprising two mobile terminals MT1 110 and MT2 111, two radio base stations (in GSM called base transceiver stations) BTS1 120 and BTS2 121 and a base station controller BSC 130. FIG. 1a also includes an MSC that is divided in two entities, a MSC media gateway controller MSC-MGC 140 and a MSC media gateway MSC-MG 150. The MSC-MG 150 is controlled from the MSC-MGC 140 through a media gateway control interface 142 using the H.248/Megaco protocol. The MSC-MG 150 is connected to a packet switched core network 160 such as an ATM or IP based core network. A fixed terminal 161 is also connected to the core network 160. The BSC 130 is monolithic in the sense that both the call and connectivity control layers are handled by logic in the same node. A call between the BSC 130 and the MSC is however split in two layers, the call control layer 133 and the connectivity control layer 134. Both layers are connected through a standardized interface 132, the so called A-interface which is TDM based. The interface between the BSC 130 and the radio base stations BTS1 120 and BTS2 121 is a so called A-bis-interface 122 which in this configuration is a proprietary IP based interface using AMR voice coding. The air interface between the radio base stations BTS1 120, BTS2 121 and the mobile terminals MT1 110, MT2 111 is called the Um interface 112.

In a voice call between the mobile terminal MT1 110 and the fixed terminal 161, the connectivity layer (the payload or media connection) will be set up through the BTS1 120, the BSC 130, the MSC-MG 150 and the core network 160. As the voice call is AMR coded, the call needs a voice conversion to standard PCM (G.711) in the A-interface which is done by a transcoder 138 in the BSC 130.

In a call between a mobile terminal MT1 110 and another mobile terminal MT2 111, the connectivity layer (the payload/media connection) will be routed through the BTS1 120, the BSC 130, the MSC-MG 150 and back through the BSC 130 and the BTS2 121. The connectivity layer (payload) 134 is separated from the call layer (call control signaling) 133 in the BSC 130. The payload 134 is sent to the MSC-MG 150 and the call control signaling 133 is exchanged with the MSC-MGC 140 using a standardized signaling protocol such as BSSMAP/DTAP. One disadvantage in this scenario is that the payload 134 is routed via the MSC-MG 150 even if both mobile terminals MT1 110 and MT2 111 are connected through the same BSC 130. This will result in duplicated transmission paths for the payload between the BSC 130 and the MSC-MG 150. It would be preferable that the payload 134 was switched locally in the BSC 130 or even in each BTS1 120 and BTS2 121 in situations where mobile terminals are connected to the same radio base system. Another disadvantage in the scenario is that if the connectivity layer 134 is a voice connection, two transcoders 138, 139 are necessary in the BSC 130. AMR coded voice from the mobile terminal MT1 110 needs to be converted to G.711 PCM in the transcoder 138 in the BSC 130, then transported via the MSC-MG 150 and converted back to AMR in the transcoder 139 in BSC 130 before it reaches the mobile terminal MT2 111.

Figure 1B:
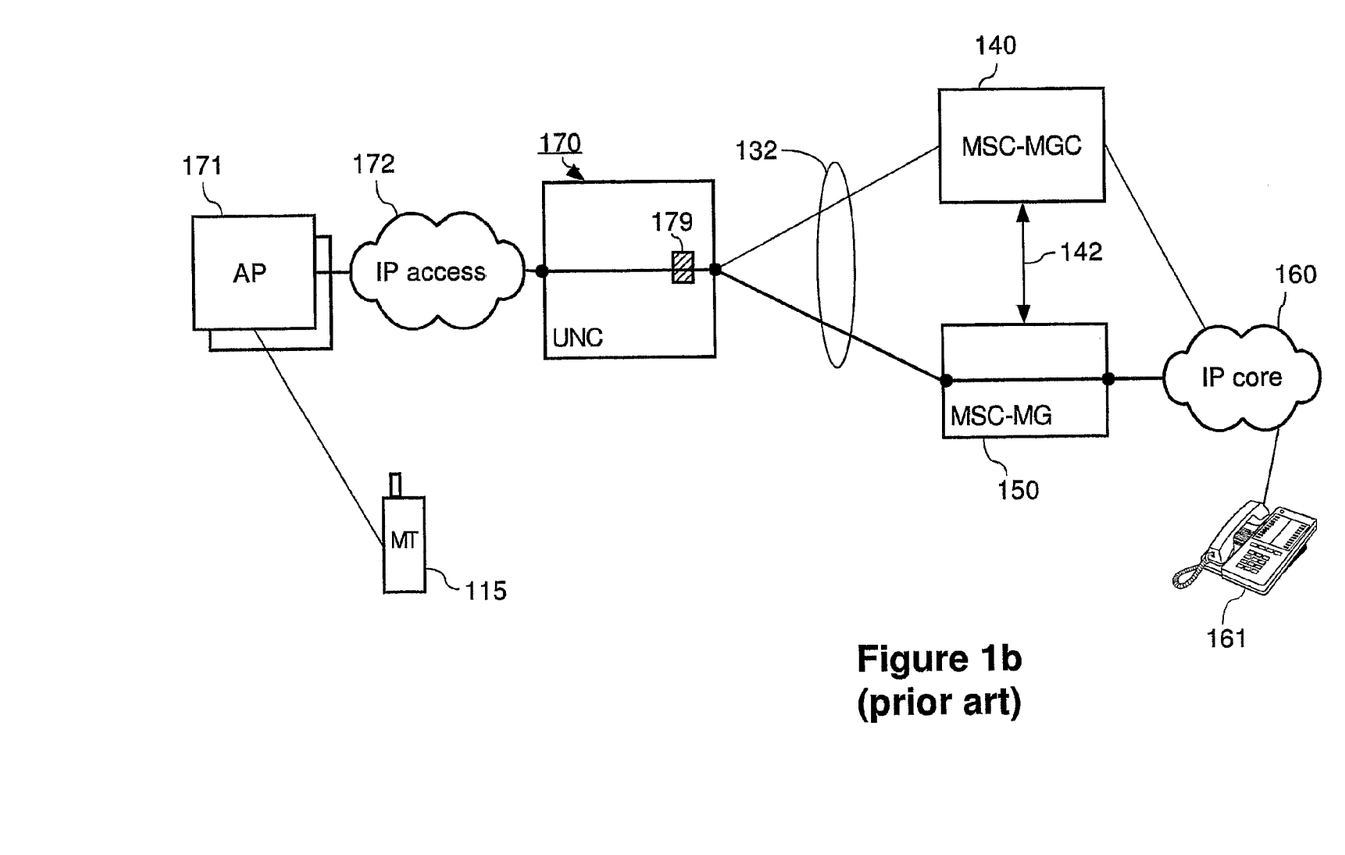
FIG. 1b is a block diagram showing an unlicensed mobile access network UMAN connected to an MSC which has call and connectivity control separated.

FIG. 1b illustrates an unlicensed mobile access network UMAN which is a local mobile network (having a radio coverage of a pico cell size) designed for homes or small offices. The UMAN comprises at least one access point AP 171 which communicates with a mobile terminal MT 115. The mobile terminal MT 115 can be a dual-mode phone which can switch over to a conventional GSM network when the pico cell is out of range. The access point AP 171 is connected to an UMAN network controller UNC 170 through an IP access network 172. The UNC 170 is further connected to the MSC media gateway controller MSC-MGC 140 and the MSC media gateway MSC-MG 150 as in FIG. 1a through the TDM based A-interface 132.

When making a voice call from the mobile terminal MT 115 to a fixed terminal 161 in the core network 160 the voice has to be converted to G.711 PCM by a transcoder 179 in the UNC 170.

Figure 2:
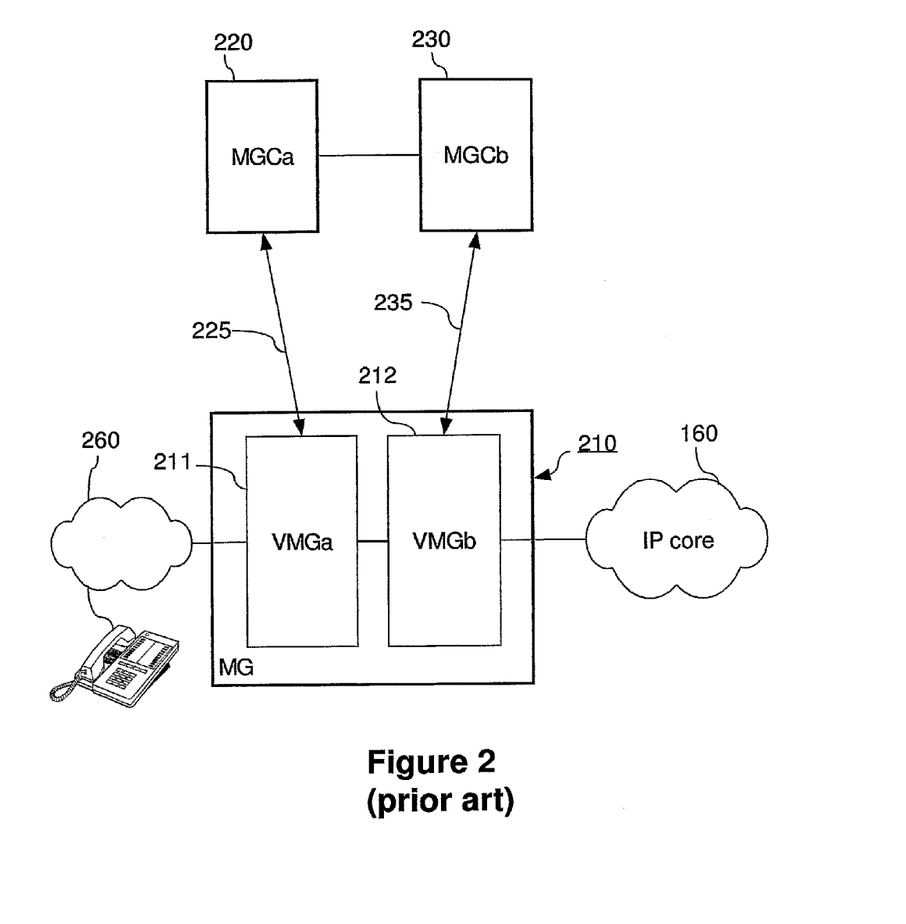
FIG. 2 is a block diagram showing a media gateway comprising two virtual media gateways.

FIG. 2 illustrates a known configuration involving a physical media gateway MG 210 comprising two virtual media gateways VMGa 211 and VMGb 212. Each virtual media gateway 211,212 are connected to and independently controlled by a media gateway controller MGCa 220 and MGCb 230 respectively, through a media gateway control interface 225,235. The physical media gateway 210 can for example be connected between an access network 260 and the IP core network 160.

Figure 3A:
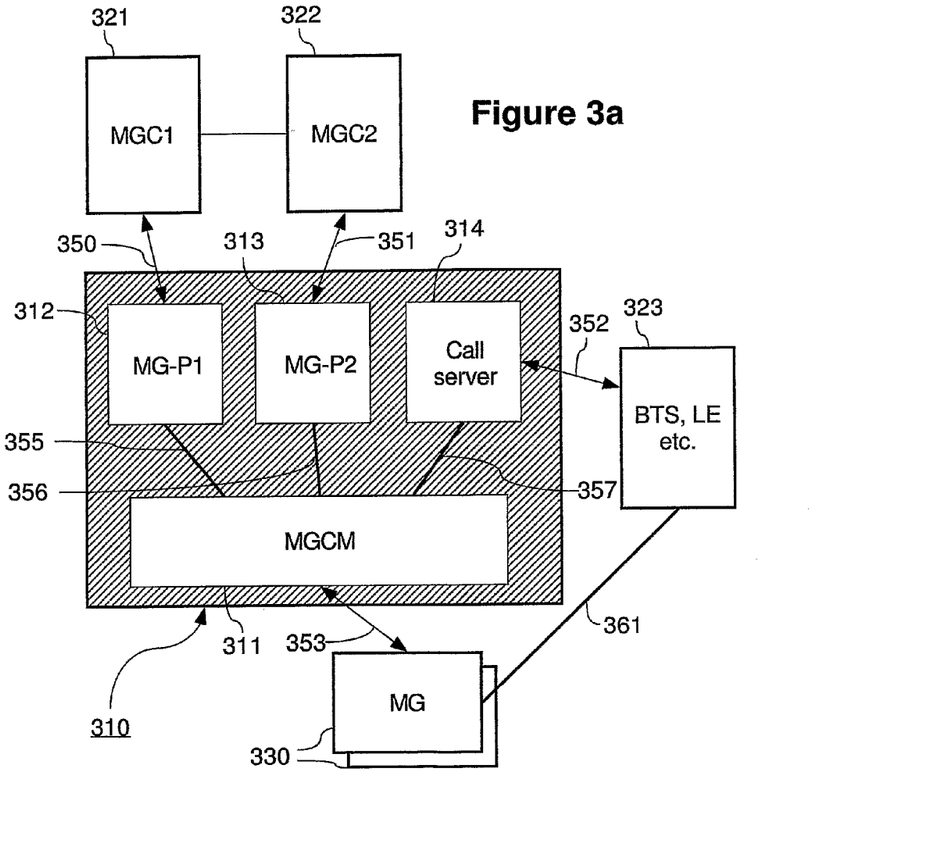
FIGS. 3a-3d are block diagrams showing a general structure of the current invention and portions of said invention in more detail.

FIG. 3a illustrates a general structure of the current invention, a new type of telecommunication system 310. The new system 310 comprises a plurality of communication modules 312-314 such as media gateway proxies MG-P1 312 and MG-P2 313 and call servers 314. The telecommunication system 310 further comprises a media gateway control module MGCM 311.

All media gateway proxies MG-P1 312, MG-P2 313 and call servers 314 are connected to the media gateway control module MGCM 311 through internal interfaces 355-357. All media gateway proxies 312,313 and call servers 314 are also adapted to be connectable through an interface 350-352 to a telecommunication node 321-323 in the telecommunication network.

Each media gateway proxy MG-P1 312 and MG-P2 313 is adapted to be connectable through a media gateway control interface 350, 351 to a media gateway controller MGC1 321 and MGC2 322 respectively. Each call server 314 is adapted to be connectable to another type of telecommunication node 323 such as a base transceiver station BTS, a local exchange etc. The call server 314 comprises call control logic ported from a legacy telecommunication node in the existing telecommunication network as for example a Base Station Controller BSC 130 from the GSM network.

The connection to the other type of telecommunication node 323 has been separated in one call control layer interface 352 and one connectivity layer (payload or media) interface 361. The call control layer interface 352 is connected to the call server 314. The signaling protocol used in the interface 352 can follow a standard signaling protocol such as SS7 or SIP. The connectivity layer interface 361 is connected to the media gateway MG 330.

Each media gateway proxy MG-P1 312 and MG-P2 313 terminates media gateway control signaling from the corresponding media gateway controllers MGC1 321 and MGC2 322 and relays control orders it receives through the media gateway control interfaces 350, 351 to the media gateway control module MGCM 311 through the internal interfaces 355, 356.

Each integrated call server 314 on the other hand comprises own call control logic but interacts with the media gateway control module in a similar way as the media gateway proxies 312,313 through the internal interface 357.

The MGCM 311 is adapted to be connectable to a media gateway MG 330 and to aggregate the control orders it receives from the media gateway proxies 312,313 and from the integrated call servers 314 towards the one and the same media gateway MG 330 through a media gateway control interface 353.

Figure 3B:
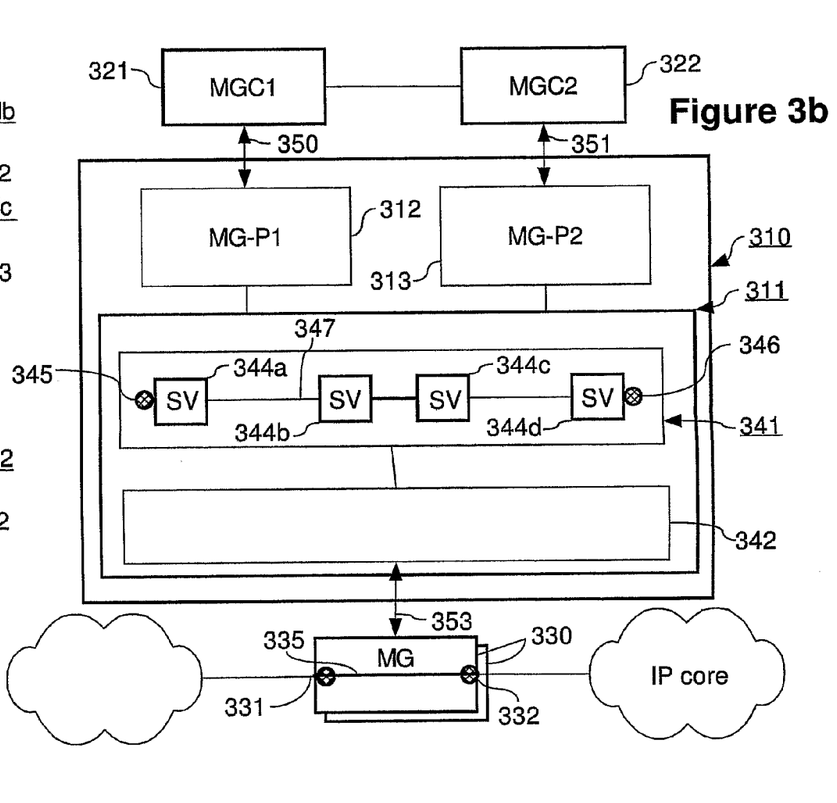

FIG. 3b illustrates the MGCM 311 more in detail. The MGCM 311 comprises a Connection Service portion 341 and a Connection Coordination portion 342. The Connection Service portion 341 receives control orders from the communication modules 312-314. In FIG. 3a these communication modules are exemplified by the two media gateway proxies MG-P1 312 and MG-P2 313. The control orders from the media gateway proxies 312,313 are extracted from the standardized media gateway control protocol between the media gateway proxies 312,313 and the media gateway controllers 321,322. When receiving the control orders the Connection Service portion 341 establishes a logical path 347 comprising a chain of switch views 344a-344d. Each switch view 344a-344d is a logical representation of a connection. The switch views 344a-344d are of different types. The switch views 344a and 344d are Access Switch Views representing a physical termination with one physical channel and one logical channel. The switch views 344b and 344c are Logical Switch Views with only logical channels. A connection in a switch view can be 'one-way', 'both-way', or 'both-way asymmetrical'.

Figure 3C:
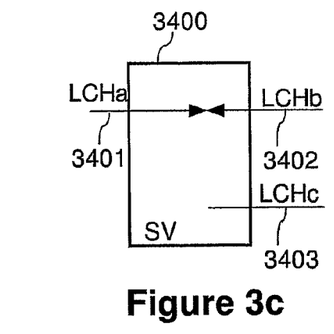
Figure 3D:
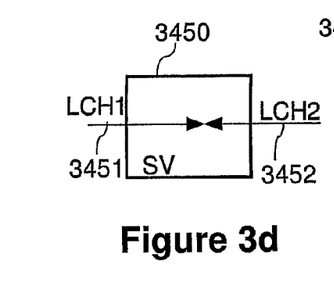

Turning now to FIG. 3c, each switch view 3400 has a plurality of 'inlets' called logical channels LCHa-LCHc 3401-3403 and these can either be 'connected' as LCHa 3401 and LCHb 3402, or be 'on hold' as LCHc 3403. A simple both-way connection (now turning to FIG. 3d) can be represented by a 'both-way' switch view 3450 with two connected logical channels LCH1 3451 and LCH2 3452. For each new control order received from any of the communication modules 312-314, the Connection Service portion 341 may need to modify the Switch View 3450.

Turning back to FIG. 3b the logical path 347 comprising the chain of switch views 344a-344d begins and ends with two points 345,346 that each represents a physical inlet and/or outlet (a termination). The sum of all connections in the chain of switch views 344a-344d represents the resulting physical path between the terminations 345,346.

The identities of said terminations 345,346 are sent to the Connection Coordination portion 342. The Connection Coordination portion 342 is adapted to have a total topology view of the telecommunication network or a network domain and is further adapted to calculate a new, most optimal physical path through the network using known methods as for example selecting the path with the lowest cost i.e. having the lowest sum of cost parameters. When the Connection Coordination portion 342 has calculated the new physical path, it will order the establishment of a connection 335 between two terminations 331 and 332 in the MG 330 by sending media gateway control orders to the MG 330 through the media gateway control interface 353. If only one media gateway 330 is involved, the terminations 331 and 332 in the MG 330 corresponds to the terminations 345 and 346 in the Connection Service portion 341.

As shown in FIG. 3b, the telecommunication system 310 is not limited to control only one media gateway 330 but it is adapted to be connectable and to control a plurality of such gateways 330. The Connection Coordination portion 342 can when calculating the optimal path conclude that more than one MG 330 is needed in order to establish the new physical path between the two terminations 345, 346. In this case the Connection Coordination portion 342 sends control orders to a plurality of media gateways 330 with a second set of terminations.

If (in a very simple example) a call has to be established that involves both the media gateway controllers MGC1 321 and MGC2 322, each of said media gateway controllers 321, 322 sends media gateway control signaling messages towards the telecommunication system 310 through the media gateway control interfaces 350 and 351 respectively, this in the belief that it is communicating with its 'own' media gateway. MGC1 321 sends signaling messages in order to create a context comprising terminations A and B in 'its' media gateway. Correspondingly MGC2 322 sends signaling messages in order to create a context comprising terminations C and D in 'its' media gateway. The two media gateway controllers MGC1 321 and MGC2 322 have their own 'Context view' of the call to be established. The two media proxies MG-P1 312 and MG-P2 313 extract the control orders from the signaling messages from the two external media gateway controllers MGC1 321 and MGC2 322 and relay these control orders to the Connection Service portion 341 in the MGCM 311. The Connection Service portion 341 receives these control orders and builds a chain of switch views 347 from the two 'context views'. In the current example, the Connection Service portion 341 concludes from the chain of switch views 347, that no physical connection is necessary between the terminations B and C and informs the Connection Coordination portion 342 that the remaining terminations A and D correspond to the terminations 345,346. With the received information, the Connection Coordination portion 342 creates a new 'context view'. As the Connection Coordination portion 342 has a total topology knowledge of the network, it concludes that the resulting optimized physical connection can be established through the MG 330 and involving terminations A and D only and orders the creation of a payload/media connection through the MG 330 between the two terminations 331 and 332.

Again, the example above is very simplified. Normally a call setup involves a number of different connection steps involving different resources from one step to another. Some examples are the connection and the disconnection of tone senders and code receivers (for detecting the dialed number) during the call setup. When making a conference call this will also include the connection and disconnection of a conference bridge. The example above is also limited to a scenario involving two media gateway controllers MGC1 321 and MGC2 322. When involving a call server 314, this server is not necessarily adapted to use the standardized concept of contexts and terminations. As the logic in the call server 314 can be ported from a legacy telecommunication node (such as a traditional BSC 130) the Connection Service portion 341 is also designed to adapt any proprietary 'switch view' seen by the call server 314 to the chain of switch views 347 as in FIG. 3b.

Turning further back to FIG. 3a and summarizing the relationships between the telecommunication system 310 in the current invention and the other nodes, the telecommunication system 310 is adapted in such way that each media gateway controller 321-322 through its media gateway control interface 350,351 views the telecommunication system 310 as it was an ordinary media gateway MG. Moreover, the media gateway MG 330 does through its media gateway control interface 353 view the telecommunication system 310 as if it was an ordinary media gateway controller MGC. The other type of telecommunication node 323 can from its perspective also view the communications node 310 as a media gateway controller MGC but through the interface 352.

Figure 4:
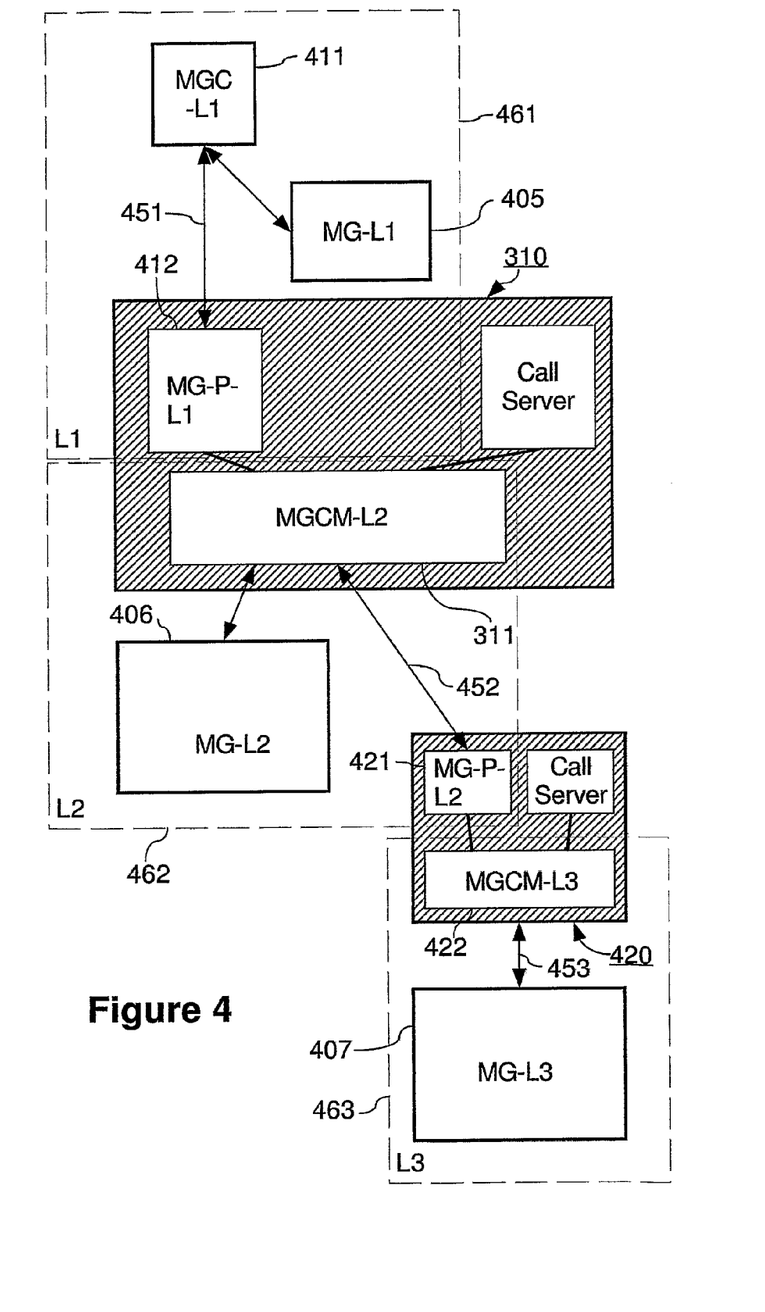
FIG. 4 is a block diagram showing at least two instances of the current invention connected to each other in a hierarchical fashion.

The current invention does also allow several instances of the telecommunication system 310 to be connected in a hierarchical manner as seen in FIG. 4. In FIG. 4 a telecommunication system 310 is connected to another telecommunication system 420 of the same type as 310. The telecommunication system 310 will through the media gateway control interface 452 view the other telecommunication system 420 as an ordinary media gateway MG. Correspondingly, the telecommunication system 420 will view the telecommunication system 310 as an ordinary media gateway controller MGC. The telecommunication system 420 can in turn control other media gateways MG-L3 407 over the interface 453.

With the current invention independent domains on different hierarchical levels (sub domains) can be defined. In FIG. 4, a first level domain L1 461 consists of a media gateway controller MGC-L1 411, a media gateway proxy MG-P-L1 412 controlled by MGC-L1 411 through an interface 451, and an ordinary media gateway MG-L1 405. A second level sub domain L2 462 consists of the media gateway control module MGCM (here called MGCM-L2) 311 in the telecommunication system 310, a corresponding media gateway proxy MG-P-L2 421 in the communications node 420 and an ordinary media gateway MG-L2 406. A third level sub domain L3 463 consists of a media gateway control module MGCM-L3 422 in the telecommunication system 420 and the media gateway MG-L3 407.

The domains in the different levels L1-L3 461-463 are independent of each other. The level 1 media gateway controller MGC-L1 411 for example regards the media gateway proxy MG-L1 412 as an ordinary media gateway that is part of its own level 1 domain L1 461. The sub domains on the lower levels L2 462 and L3 463 are invisible to the MGC-L1 411.

Figure 5:
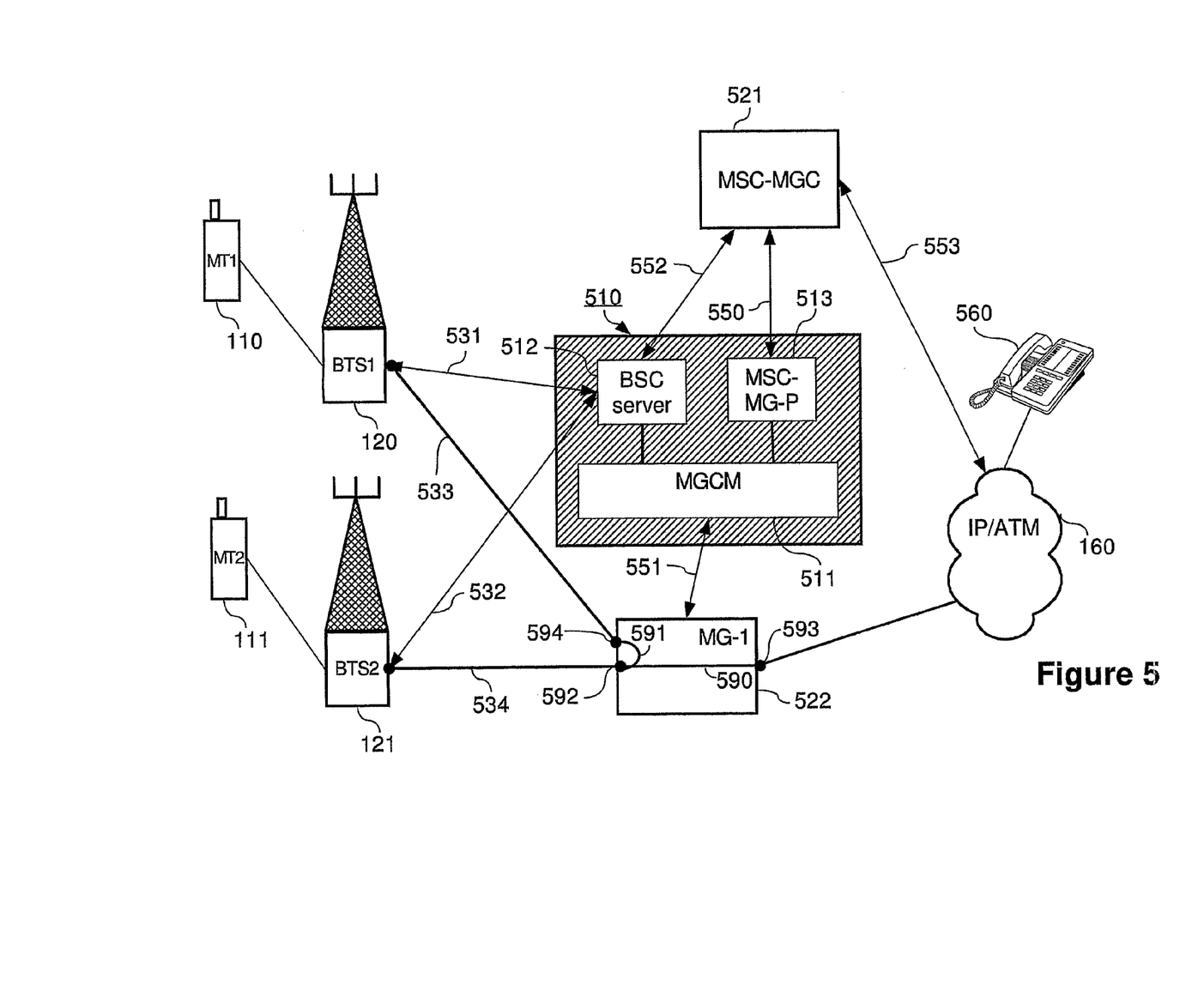
FIG. 5 is a block diagram showing a first embodiment of the current invention applied to a GSM network.

FIG. 5 illustrates one embodiment of the invention where the inventive concept is used in a GSM network. One problem that is solved by this embodiment is the problem illustrated by FIG. 1a, where the payload is switched in the Mobile Switching Center MSC-MG 150 even if the call is made between two mobile terminals MT1 110 and MT2 111 that are connected to the same Base Station Controller BSC 130. In the embodiment in FIG. 5, a telecommunication system 510 is connected to two base stations BTS1 120 and BTS2 121, one media gateway controller MSC-MGC 521 and one media gateway MG-1 522. The telecommunication system 510 comprises an integrated BSC server 512, a MSC media gateway proxy MSC-MG-P 513 and a media gateway control module MGCM 511. Compared to the network configuration in FIG. 1*a*, each connection between the radio base stations BTS1 120, BTS2 121 and the BSC 130 has been separated in one call control layer interface 531,532 and one connectivity layer interface 533,534. The logic that handled the call control layer in the BSC 130 has been integrated in the telecommunication system 510 as the integrated BSC server 512. The connectivity layer of the BSC 130 and MSC-MG 150 in FIG. 1*a* is in FIG. 5 handled by logic in the common media gateway MG-1 522 that is connected to the BTS1 120 and BTS2 121 through the connectivity layer interfaces 533 and 534. The common media gateway MG-1 522 is connected to the telecommunication system 510 through a media gateway control interface 551. The MSC media gateway controller MSC-MGC 521 is in turn connected to the MSC-MG-P 513 in the telecommunication system 510 through a media gateway control interface 550. Both media gateway control interfaces 550 and 551 can be according to the H.248/Megaco standard. The interface 552 between the MSC-MGC 521 and the BSC server 512 is still the call control layer part of the A-interface whereas the connectivity layer part of the A-interface has been eliminated as it has become replaced by the media gateway MG-1 522. The call control layer of the MSC-MGC 521 is connected to the core network 160 through an interface 553 which can be according to the SS7 or SIP standard.

When establishing a call from the mobile terminal MT2 111 to the terminal 560 in the core network 160, the BTS2 121 forwards a call setup request message received from the mobile terminal MT2 111 to the integrated BSC server 512 over the call control layer 532. The BSC server 512 forwards the call setup request over the A-interface signaling link 552 to the MSC media gateway controller MSC-MGC 521. The MSC-MGC 521 concludes that the called terminal 560 is located outside the GSM network and routes the call further towards the core network 160 over the call control interface 553. When the called terminal 560 is located, a physical path for payload transmission has to be established between the calling mobile terminal MT2 111 and the called terminal 560. A payload connection is established between the mobile terminal MT2 111 and a termination 592 in the media gateway MG-1 522. The BSC server 512 sends control orders to the media gateway control module MGCM 511. The MSC-MGC 521 sends media gateway control orders to the MSC media gateway proxy MSC-MG-P 513. The MSC media gateway proxy MSC-MG-P 513 relays the control orders to the media gateway control module MGCM 511 which in turn aggregates all the received control orders. The MGCM 511 that has knowledge of all resources within its network domain optimizes the physical path needed through the domain and sends media gateway control orders to the MG-1 522 through the media gateway control interface 551. The MG-1 522 through-connects a payload connection 590 between the termination 592 and a termination 593, the latter connected to the core network 160. As the optimized physical path now goes through an IP based network only, IP/TDM conversion is no longer necessary.

When establishing a call from the mobile terminal MT1 110 to another mobile terminal MT2 111, the BTS1 120 forwards a call setup request message received from the mobile terminal MT1 110 to the integrated BSC server 512 over the call control layer 531. The BSC server 512 forwards the call setup request to the MSC-MGC 521. When the mobile terminal MT2 111 has been located, a physical path for payload transmission between the two mobile terminals has to be established. A payload connection is established between the mobile terminal MT1 110 and a termination 594 in the MG-1 522 and a payload connection is established between the mobile terminal MT2 111 and the termination 592 in the same MG-1 522. The BSC server 512 sends control orders to the media gateway control module MGCM 511. The MSC-MGC 521 sends media gateway control orders to the MSC media gateway proxy MSC-MG-P 513. The MSC media gateway proxy MSC-MG-P 513 relays the control orders to the media gateway control module MGCM 511 which in turn aggregates all the received control orders. The MGCM 511 that has knowledge of all resources within its network domain optimizes the physical path needed through the domain and sends media gateway control orders to the MG-1 522 through the media gateway control interface 551. The MG-1 522 through-connects a payload connection 591 between the terminations 594 and 592 in MG-1 522.

Figure 6:
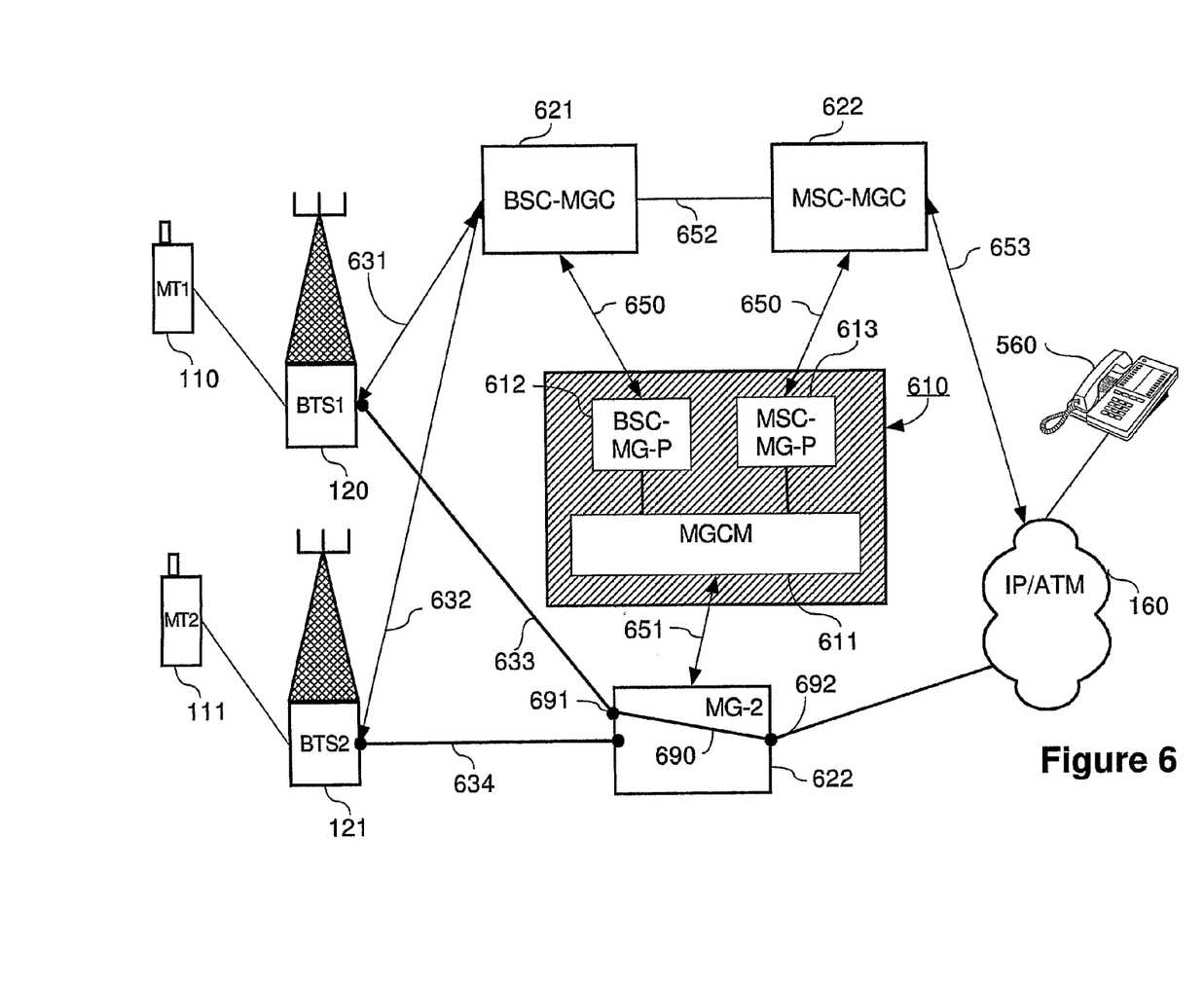
FIG. 6 is a block diagram showing a second embodiment of the current invention applied to a GSM network.

FIG. 6 illustrates an alternative embodiment, a telecommunication system 610, which solves the same problems as the embodiment illustrated by FIG. 5. In this embodiment the telecommunication system 610 comprises a BSC media gateway proxy BSC-MG-P 612, a MSC media gateway proxy MSC MG-P 613 and a media gateway control module MGCM 611.

As in the embodiment illustrated in FIG. 5, each connection between the BTS1 120 and BTS2 121 and the BSC 130 has been separated in one call control layer 631,632 and one connectivity layer 633,634. The logic that handles the call control layer of the BSC 130 is in this embodiment a stand-alone BSC media gateway controller BSC-MGC 621. The connectivity layers 633,634 from BTS1 120 and BTS2 121 are connected to a common media gateway MG-2 622.

The difference between this embodiment and the one illustrated in FIG. 5 is that the integrated BSC server 512 has been replaced by the stand-alone BSC media gateway controller BSC-MGC 621 and the BSC media gateway proxy BSC-MG-P 612 located in the telecommunication system 610. The BSC-MG-P 612 is connected to the BSC-MGC 621 and the MSC-MG-P 613 is connected to a MSC-MGC 622 through a media gateway control interface 650 (such as H.248/Megaco). The call control layer 652 between the BSC-MGC 621 and the MSC-MGC 622 is transported over a signaling interface 652. The MSC-MGC 622 is further connected to the core network 160 through an interface 653.

When establishing a call from the mobile terminal MT1 110 to the terminal 560 in the core network 160, the BTS1 120 forwards a call setup request message received from the mobile terminal MT1 110 to the BSC-MGC 621 over the call control layer 631. The BSC-MGC 621 forwards the call setup request over a signaling link 652 to the MSC media gateway controller MSC-MGC 622. The MSC-MGC 622 concludes that the called terminal 560 is located outside the GSM network and routes the call further towards the core network 160 over the interface 653. When the called terminal 560 is located, a physical path for payload transmission has to be established between the calling mobile terminal MT1 110 and the called terminal 560. A payload connection is established between the mobile terminal MT1 110 and a termination 691 in the media gateway MG-2 622. The BSC-MGC 621 and the MSC-MGC 622 send media gateway control orders through the media gateway control interfaces 650 to the BSC media gateway proxy BSC-MG-P 612 and the MSC media gateway proxy MSC-MG-P 613 respectively. The two media gateway proxies 612,613 relay the control orders to the media gateway control module MGCM 611. The MGCM 611 in turn aggregates the control orders it receives. The MGCM 611 that has knowledge of all resources within its network domain optimizes the physical path needed through the domain and sends media gateway control orders to the MG-2 622 through a media gateway control interface 651. The MG-2 622 through-connects a payload connection 690 between the termination 691 and a termination 692 (the latter one connected to the core network 160).

Figure 7:
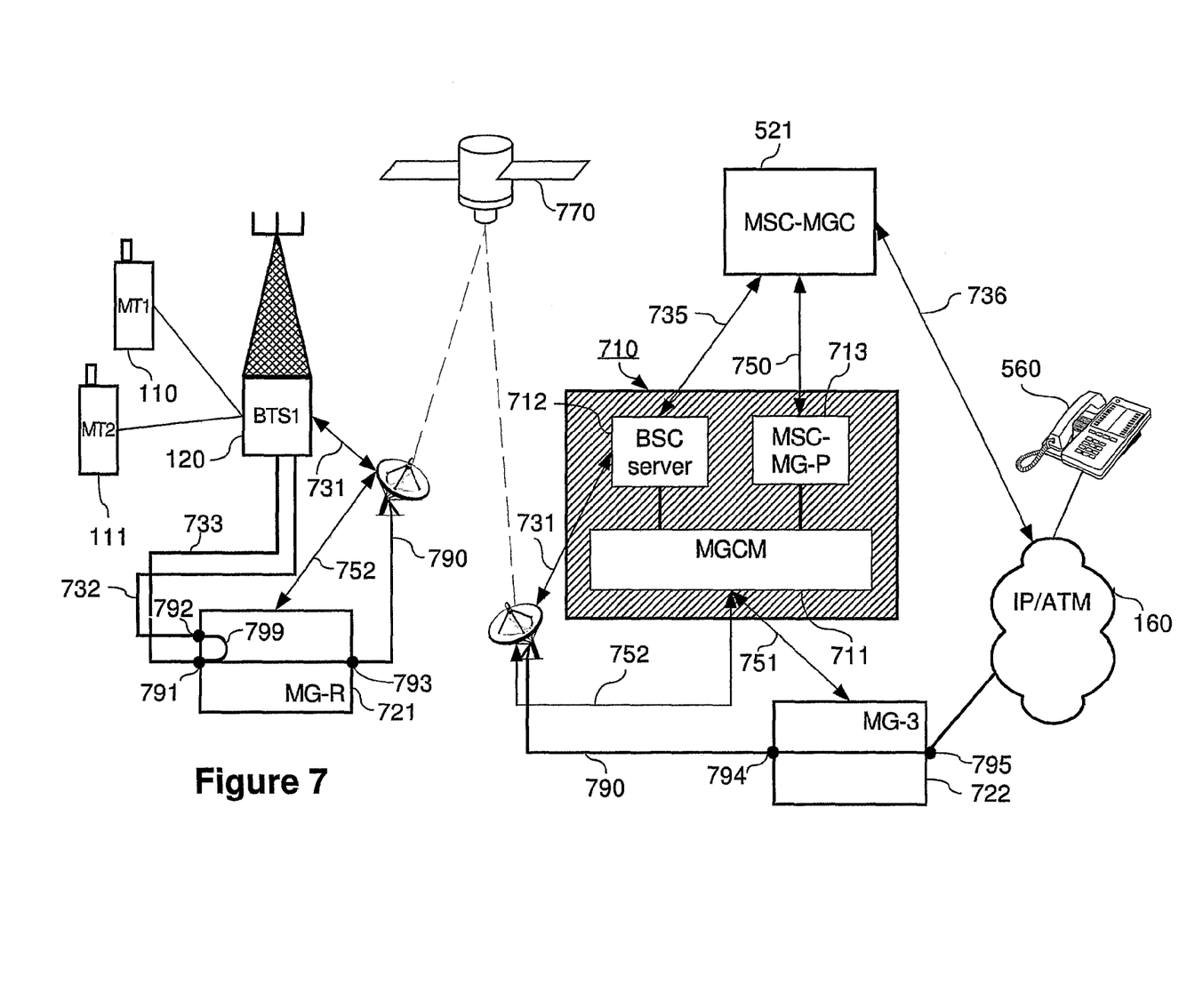
FIG. 7 is a block diagram showing a third embodiment of the current invention applied to a GSM network.

FIG. 7 illustrates yet another embodiment of the invention, a telecommunication system 710 applied to a network configuration where the BTS1 120 is remotely located. In this configuration, the telecommunication system 710 comprises a BSC server 712, a media gateway proxy MSC-MG-P 713 and a media gateway control module MGCM 711. The telecommunication system 710 is further controlling two media gateways, a common media gateway MG-3 722 and a remote media gateway MG-R 721, the latter situated in the vicinity of the BTS1 120. The two media gateways MG-3 722 and MG-R 721 are controlled through media gateway control interfaces 751 and 752 respectively. As in the configurations illustrated by FIGS. 5 and 6, the connection from the BTS1 120 is separated in a call control layer 731 and in a connectivity layer 732, 733. The logic in the telecommunication system 710 that handles the call control layer 731 from the BTS1 120 is in this embodiment the integrated BSC server 712. The connectivity layer 732, 733 from the BTS1 120 is connected to the remote media gateway MG-R 721. The transport of payload data between the remote media gateway MG-R 721 and the media gateway MG-3 722 is done over the connectivity layer 790. All communication (call control 731, connectivity control 790 and media gateway control 752) between the telecommunication system 710 and the remotely located BTS1 120 and MG-R 721 is transported over a long distance network (that can include a satellite network 770).

When establishing for example a long distance call from the mobile terminal MT1 110 to the terminal 560 in the core network 160, the BTS 120 forwards a call setup request message from the mobile terminal MT1 110 to the integrated BSC server 712 over the call control layer 731. The BSC server 712 forwards the call setup request over an A-interface signaling link 735 to a MSC media gateway controller MSC-MGC 521. The MSC-MGC 521 concludes that the called terminal 560 is located outside the GSM network and routes the call further towards the core network 160 over the interface 736. When the called terminal 560 is located, a physical path for payload transmission has to be established between the calling mobile terminal MT1 110 and the called terminal 560. A payload connection 733 is established between the mobile terminal MT1 110 and a termination 791 in the media gateway MG-R 721. The BSC server 712 sends control orders to the media gateway control module MGCM 711 and the MSC-MGC 521 sends media gateway control orders through the media gateway control interface 750 to the MSC media gateway proxy MSC-MG-P 713. The MSC media gateway proxy MSC-MG-P 713 relays the control orders to the media gateway control module MGCM 711 which in turn aggregates all the control orders it receives from the BCS server 712 and the MSC-MG-P 713. The MGCM 711 which has knowledge of all resources within its network domain (including the media gateways MG-R 721 and MG-3 722) optimizes the physical path needed through the domain and sends media gateway control orders to MG-R 721 and MG-3 722 through the gateway control interfaces 752 and 751 respectively. In order to establish said physical path between the BTS1 120 and the core network 160, the media gateway MG-R 721 through-connects between two terminations 791 and 793 and the media gateway MG-3 through-connects between two terminations 794 and 795.

Staying with the configuration in FIG. 7, a call that is made between two mobile terminals MT1 110 and MT2 120 connected to the same BTS1 120 can with the current invention be locally switched in the remote media gateway MG-R 721. The BTS1 120 establishes one payload connection 732 to a termination 792 in the MG-R 721 and one payload connection 733 to a termination 793 in the same MG-R 721. Following a similar call setup procedure as illustrated in FIG. 5, the telecommunication system 710 orders the MG-R 721 to through-connect a physical connection 799 between terminations 792 and 793.

Figure 8:
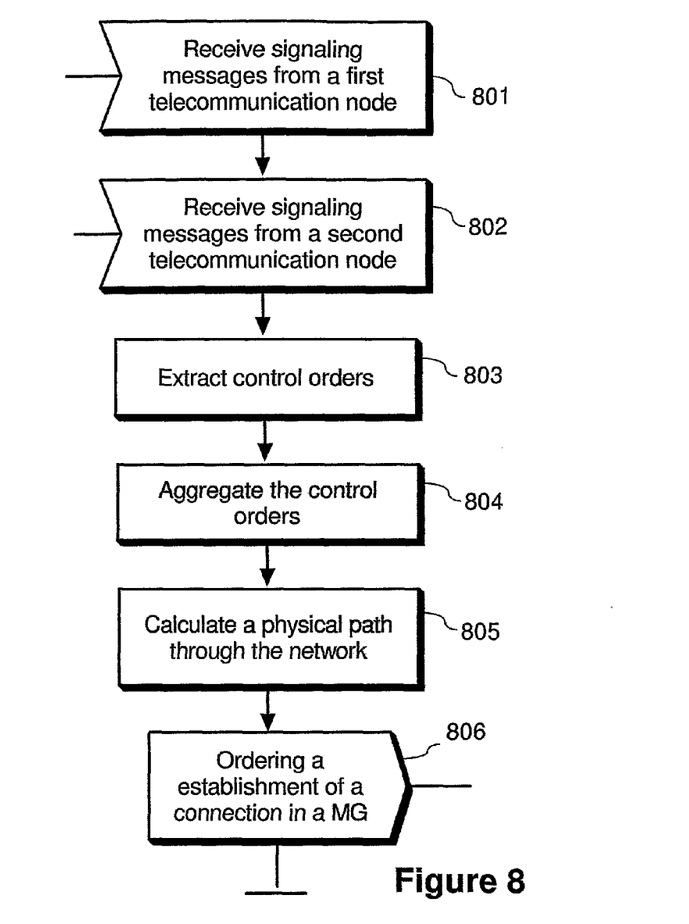
FIG. 8 is a flow chart showing the steps of establishing a payload connection according to the present invention.

The embodiments described above and illustrated by the corresponding figures are all using the method in the current invention to establish a payload connection in a media gateway. FIG. 8 summarizes this method in a flow chart.

In step 801, the telecommunication system 310 receives signaling messages from a first telecommunication node 321-323. In step 802, the telecommunication system 310 receives signaling messages from a second telecommunication node 321-323. These telecommunication nodes 312-323 can be media gateway controllers 321,322 acting as for example a MSC server in a network having a separated call and connectivity layer. The telecommunication nodes 312-323 can also be other nodes 323 in the telecommunication network such as Base Transceiver Stations BTS, Local Exchanges LE etc.

In step 803, call control orders received in the signaling messages are extracted. This is done by the communication module 312-314. This module 312-314 can be a media gateway proxy MG-P 312,313 or an integrated call server 314.

In step 804, the control orders are aggregated. This is done by the media gateway control module MGCM 311. As the MGCM 311 has knowledge of all resources within its network domain, it can calculate and optimize, step 805, the path for the payload connection. If both the first and the second communication module 321,322 are media gateway controllers, the MGCM aggregates the two 'context views' received from the two media gateway controllers 321,322 and creates a new context. The MGCM 311 further requests the media gateway 330 to establish this new context i.e. to establish the payload connection. This is done by sending media gateway control orders, step 806, to the external media gateway 330.

The current invention is in the described embodiments applied to mobile networks. A person skilled in the art would apply the inventive concept in a number of other network scenarios including local access networks, fixed networks, IMS (IP Multimedia Subsystem) networks, UMAN (Unlicensed Mobile Access) networks, enterprise networks etc.

Furthermore, the telecommunication system 310 in the current invention can be implemented either as a stand-alone function in a dedicated telecommunication node or as an additional function to an existing telecommunication node, having other network functions.

The invention claimed is:

1. A telecommunication system for controlling media gateways in a telecommunication network, said system comprising:

a plurality of media gateway proxies connectible to a plurality of media gateway controllers, so as to create pairs, where each of the pairs comprises a media gateway proxy and an associated media gateway controller connectible together by a media gateway controller interface, each media gateway proxy in the telecommunication network receiving signaling messages from the media gateway proxy's associated media gateway controller;

a media gateway control module having a separate internal interface for each of the plurality of media gateway proxies and a media gateway control layer interface for a telecommunications node which is coupled with the media gateway control module through at least one media gateway;

wherein the media gateway proxies are configured to extract media gateway control orders in the signaling messages received from the media gateway controller and to send the control orders to the media gateway control module;

wherein the media gateway control module is configured to:
aggregate the media gateway control orders received from at least two of the media gateway proxies;
calculate an optimal path for a payload connection based on the aggregated media gateway control orders and network resources known to the media gateway control module; and
order establishment of the payload connection in the media gateway by sending media gateway control signaling messages to the media gateway on the media gateway control layer interface.

2. The telecommunication system according to claim 1, wherein the signaling messages received from the media gateway controller are H.248/Megaco signaling messages compliant with the H.248/Megaco media gateway control signaling protocol.

3. The telecommunication system according to claim 1, wherein the media gateway control signaling messages sent from the media gateway control module to the media gateway are compliant with the H.248/Megaco protocol.

4. The telecommunication system according to claim 1, wherein the media gateway control module includes a connection service portion and a connection coordination portion.

5. The telecommunication system according to claim 4, wherein the connection service portion is configured to process the control orders received form the communication modules and to establish a logical path comprising a chain of switch views representing a first physical path having a first set of a plurality of terminations.

6. The telecommunication system according to claim 5, wherein the connection coordination portion is configured to receive the identities of terminations in the first set of a plurality of terminations from the connection service portion and to calculate a second physical path having a second set of a plurality of terminations.

7. The telecommunication system according to claim 6, wherein the connection coordination portion is also configured to order the media gateway to establish the connection in the media gateway, the connection belonging to the second physical path.

8. The telecommunication system according to claim 1, wherein the media gateway control module is configured to connect to a media gateway proxy in at least one other instance of the telecommunication system.

9. A method of ordering the establishment of a connection in a media gateway in a telecommunication network, said method being executed in a media gateway control module, the method comprising the steps of:
receiving from a first media gateway proxy on a first internal interface of the media gateway control module, control orders from extracted signaling messages from a first media gateway controller;
receiving from a second media gateway proxy on a second internal interface of the media gateway control module, control orders extracted signaling messages from a second media gateway controller;
aggregating the extracted control orders in a connection services portion of the media gateway control module;
calculating in a connection coordination portion of the media gateway control module, a physical path through the telecommunication network; and
ordering by the connection coordination portion the establishment of the connection in the media gateway by sending media gateway control signaling messages to the media gateway, wherein the connection belongs to the physical path.

10. The method according to claim 9, wherein the received signaling messages from the media gateway controller are compliant with the H.248/Megaco media gateway control signaling protocol.

11. The method according to claim 9, wherein the media gateway control signaling messages sent to the media gateway are compliant with the H.248/Megaco protocol.

12. The method according to claim 9, wherein the step of aggregating the extracted control orders includes the steps of:
processing the control orders; and
establishing a logical path based on the processing of the control orders, the logical path comprising a chain of switch views representing a first physical path having a first set of a plurality of terminations.

13. The method according to claim 12, wherein the step of calculating a physical path through the telecommunication network also includes calculating a second physical path having a second set of a plurality of terminations.

14. The method according to claim 13, wherein the step of calculating a second physical path includes selecting a physical path having the lowest sum of cost parameters.

* * * * *